United States Patent [19]
Iwahashi

[11] Patent Number: 5,407,145
[45] Date of Patent: Apr. 18, 1995

[54] TAPE CASSETTE HAVING AN IMPROVED LID/SUB LID STRUCTURE

[75] Inventor: Yuji Iwahashi, Miyagai, Japan

[73] Assignee: Sony Corporation, Tokyo, Japan

[21] Appl. No.: 43,930

[22] Filed: Apr. 8, 1993

[30] Foreign Application Priority Data

Apr. 14, 1992 [JP]  Japan ................................ 4-093225

[51] Int. Cl.6 ............................................. G11B 23/02
[52] U.S. Cl. ................................................. 242/347.1
[58] Field of Search ............. 242/197, 198, 199, 347.1; 360/132

[56]  References Cited

U.S. PATENT DOCUMENTS

| | | | |
|---|---|---|---|
| 4,607,308 | 8/1986 | Tsuruta et al. | 242/197 X |
| 4,680,660 | 7/1987 | Ueda | 242/199 X |
| 4,685,016 | 8/1987 | Baranski | 360/132 |
| 5,198,951 | 3/1993 | Fujii | 242/199 |

Primary Examiner—Daniel P. Stodola
Assistant Examiner—John P. Darling
Attorney, Agent, or Firm—Jay H. Maioli

[57]  ABSTRACT

A tape cassette includes a main lid which is pivotally mounted on an open end of a cassette shell. The main lid pivotally mounts a sub lid having a cam boss portion which is positioned in a lower end of a cam groove provided at each side of the open end of the cassette shell. A portion of the cassette shell supporting the cam groove also includes a tape guide surface backed by a concave portion. A rib is provided across the concave portion to prevent the cam boss from entering thereinto during closing operation of the cassette, thus preventing jamming and assuring reliable opening and closing operation of the tape cassette.

7 Claims, 6 Drawing Sheets

TAPE CASSETTE HAVING AN IMPROVED LID/SUB LID STRUCTURE

BACKGROUND OF THE INVENTION

1. Field of the Invention

The present invention relates generally to a tape cassette construction. Specifically, the present invention relates to a tape cassette structure which reliably enables a cam boss of a sub lid of the cassette to return to its original position smoothly even if a cam boss portion thereof enters a concave portion due to misoperation.

2. Description of the Prior Art

Tape cassettes are widely used as a data storage medium in a number of audio, video and data processing applications. Conventional, 8 mm video cassettes utilize a closed cassette format having a housing construction utilizing a lid and a sub lid. A cam boss portion of the sub lid is guided by a cam groove provided on each side of an open portion of the cassette housing, which portion is opened and closed according to movement of the lid and the sub lid.

A cassette housing has two tape exit portions at each side of a front of the cassette housing. These tape exit portions are opened and/or closed by movement of the lid. A cam boss portion of the sub lid is guided by a cam groove provided on an inner wall forming the tape exit portion.

Operation of such a conventional cassette structure will be explained hereinbelow with reference to FIGS. 8-11.

FIG. 8 shows an enlarged perspective view of a conventional cam groove portion 101 formed in a shell of a conventional tape cassette (not shown). As may be seen in the drawing, the cam groove portion 101 is located at the front of the cassette housing. A main lid 107 and a sub lid 105 (FIG. 9) being mounted between opposing cam groove portions 101. The cam groove portion 101 includes a cam groove 104, a concave portion 103 and a substantially semicircular tape guide portion 102 is formed on a rear side of the concave portion 103. The concave portion is formed for preventing the surface of the tape guide portion 102 from shrinking and becoming concave during molding of the cassette shell as such shrinkage and concavity of the tape guide portion 102 may prevent the magnetic tape in the cassette from running smoothly and may injure the surface of the magnetic tape.

Referring now to FIG. 9, an enlarged cross-sectional view of a cassette main lid 107, sub lid 105 and the conventional cam groove portion of FIG. 8 is shown.

The main lid is pivotally attached to the cassette housing at a main axis 108 and the sub lid is pivotally attached to the main lid at a sub axis 109. As may be seen, a cam boss 106 is positioned in a lower portion of the cam groove 104 when the tape cassette is in a closed state.

A length of magnetic tape 111 is interposed between the main lid 107 and the sub lid 105. During opening operation, the main lid 107 is rotated in the clockwise direction of FIG. 9 along with the sub lid 105 causing the cam boss 106 to be moved in the upward direction to be extracted from the cam groove 104 thus exposing the magnetic tape 111 for extraction and/or winding operations, as may be seen in FIG. 10.

On the other hand, during closing operation, the above movement is reversed.

It may occur that the sub lid 105 is pushed or dislodged by misoperation of the user such that the cam boss 106 moves over the rib forming the cam groove 104 in the direction of the arrow a of FIG. 9. After moving over the rib, the cam boss 106 enters a concave portion 103. In this state it is difficult to return the cam boss 106 to the cam groove 104.

Thus, it is necessary to provide a tape cassette structure in which smooth, reliable opening and closing of the lid and sub lid portions is assured.

SUMMARY OF THE INVENTION

It is therefore a principal object of the present invention to overcome the drawbacks of the prior art.

It is a further object of the present invention to provide a tape cassette structure which reliably enables a cam boss of a sub lid of the cassette to recover its original position smoothly when the cam boss is positioned outside of the cam groove, such that reliable opening and closing of the lid and sub lid portions is assured.

In order to accomplish the aforementioned and other objects, a tape cassette is provided, comprising: an upper cassette shell; first and second reels having a tape wound thereon; a main lid; a sub lid, the sub lid cooperating with the main lid during opening and closing operations of the tape cassette; and a lower cassette shell, the lower shell including a cam groove for guiding opening and closing operations of the sub lid and a sub lid cam boss portion, the sub lid cam boss portion being movable along the cam groove, the cam groove being adjacent an open side of the lower cassette shell and having a tape guide portion formed on a rear side thereof and a concave portion adjacent thereto and having a rib portion which comes into sliding contact with the cam boss and acts to prevent the cam boss from entering the concave portion extending between the side of the forward side of the rib defining one side of the cam groove, across the concave portion and connecting to a forward edge of the tape guide portion.

DESCRIPTION OF THE PREFERRED EMBODIMENT

Figure 1:
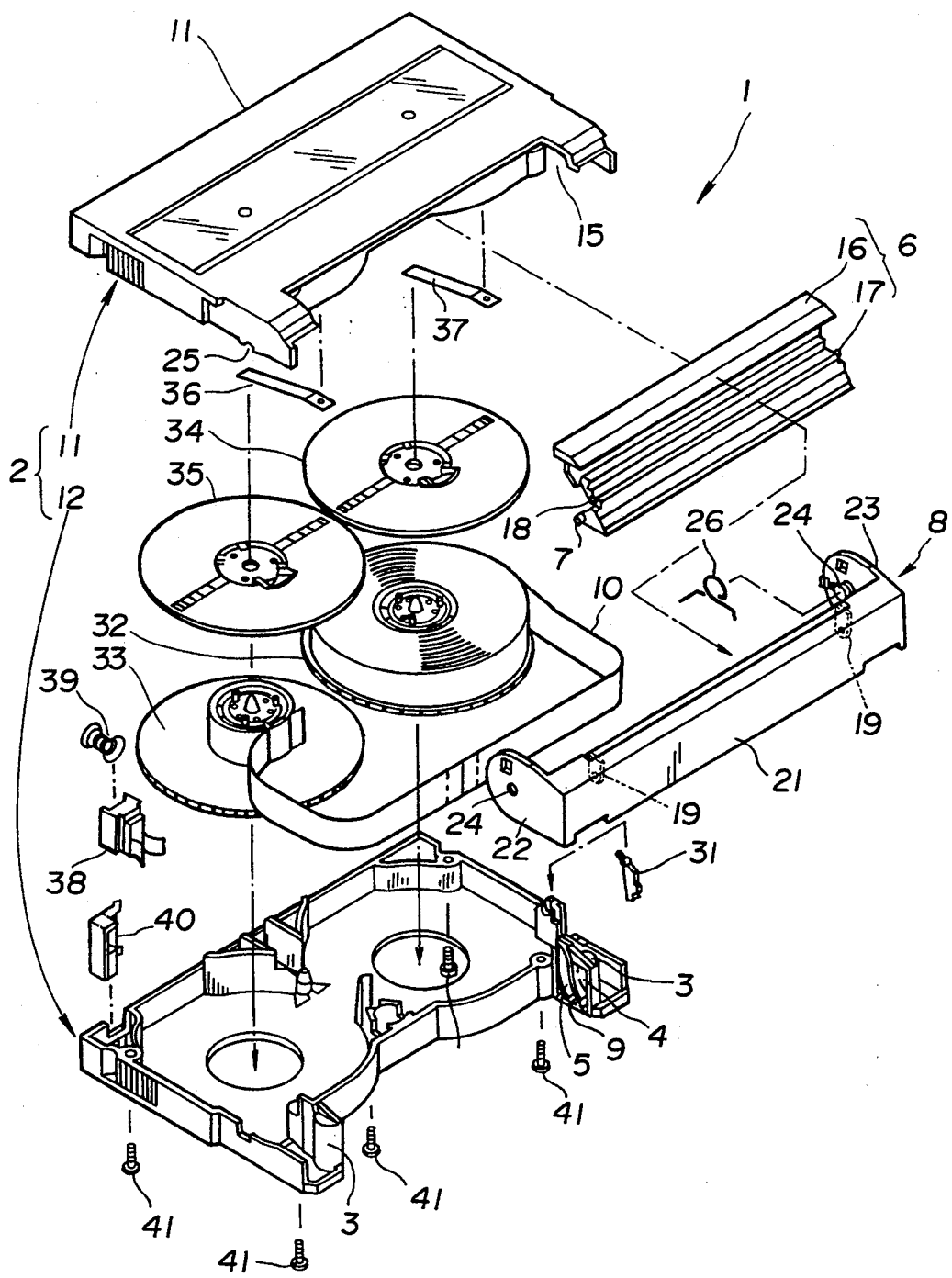
FIG. 1 shows an exploded perspective view of a tape cassette according to a first embodiment of the invention.

Referring now to the drawings, particularly to FIG. 1, a first embodiment of a tape cassette 1 according to the invention will be described hereinbelow in detail.

The tape cassette 1 includes a shell 2 comprising an upper cassette shell 11 and a lower cassette shell 12. A main lid 8 is pivotally mounted on an open end portion of the shell 2. A sub lid 6 is pivotally mounted between brackets 19 formed on opposing inner portions of the main lid 8. The upper shell 11 has an installation space 15 for accepting the sub lid 6 and the lower cassette shell 12 has cam groove assemblies similar to that described in relation to the prior art, comprising tape guide surfaces 3, 3 concave portions 4, 4 and cam grooves 5, 5. Supply and take-up reels are rotatably mounted between the upper cassette shell 11 and the lower cassette shell 12. The take-up reel includes an upper flange 35 and a lower flange 33 while the supply reel has an upper flange 34 and a lower flange 32. Magnetic tape 10 is wound between the supply and take-up reels. Also, leaf spring portions 36 and 37 are attached to an inner surface of the upper shell 11 for applying pressure for stabilizing the reels. Further provided between the upper and lower cassette shells 11 and 12 are a reel lock 38 having a reel lock spring 39 and a safety tab 40 for enabling/disabling recordability on the tape cassette 1. According to the present embodiment, the upper and lower cassette shells 11 and 12 may be joined by screws 41, 41, or the like.

Referring more specifically to the lid/sub lid structure, the main lid 8 is associated with a lid lock 31 and includes a cover plate 21, side portions 22, 23 and is pivotably mounted via main axes 24, 24. The main lid 8 is further associated with a lid spring 26, which may be a return coil spring, for example, while the sub lid 6 features: an upper surface portion 16, a lower surface portion 17, cam boss portions 7, 7 and is pivotally mounted via mounting axes 18, 18.

Figure 3:
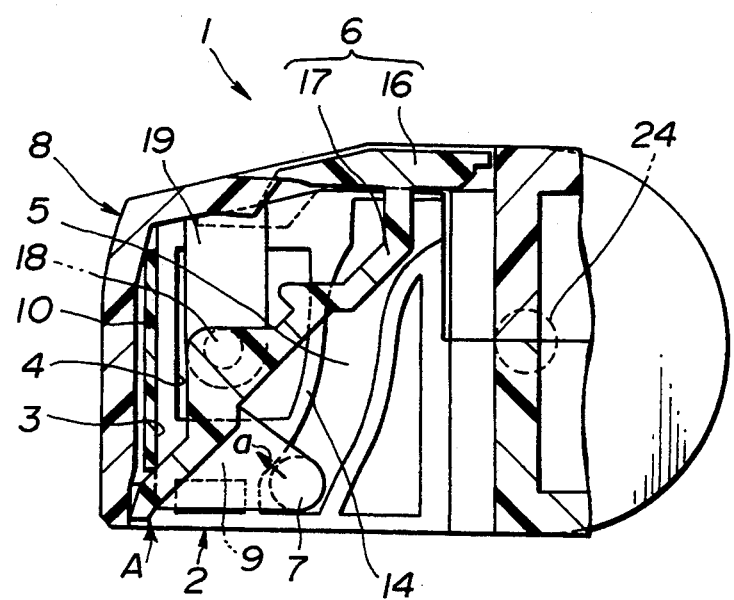
FIG. 3 is a cross-sectional view of a cassette lid, sub lid and the cam groove portion of FIG. 2.

Referring to FIG. 3, when the main lid 8 and the sub lid 6 are closed, the lower edges thereof are arranged adjacently and the magnetic tape 10 is interposed therebetween supported on the tape guide surfaces 3, 3.

Figure 4:
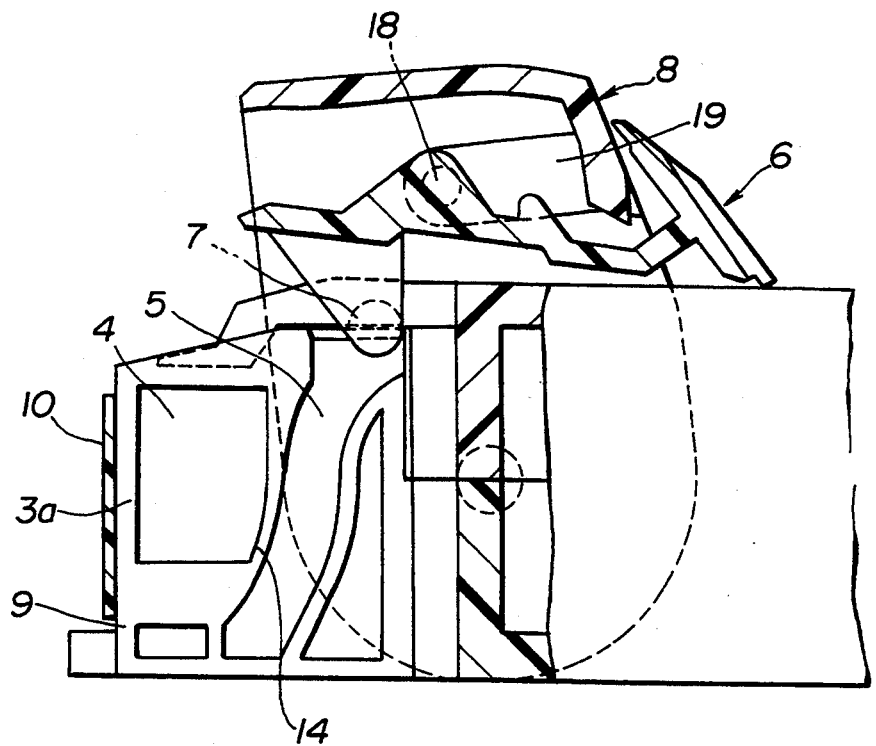
FIG. 4 is an enlarged cross-sectional view of the cassette lid, sub lid and cam groove portion when the tape cassette is in an opened state.

During opening operation the lid lock 31 is released and the lid spring 26 is active to allow movement of the main lid 8 in the clockwise direction of FIG. 3 and the cam boss 7 of the sub lid 6 is moved upwardly from the bottom of the cam groove 5. As the main lid 8 and the sub lid 6 are moved clockwise to an open position of the tape cassette 1, as seen in FIG. 4, the lower edges of the main lid 8 and the sub lid 6 become separated.

During closing operation, the above movement is reversed and the main lid 8 and sub lid 6 again resume the positions shown in FIG. 3.

Figure 5:
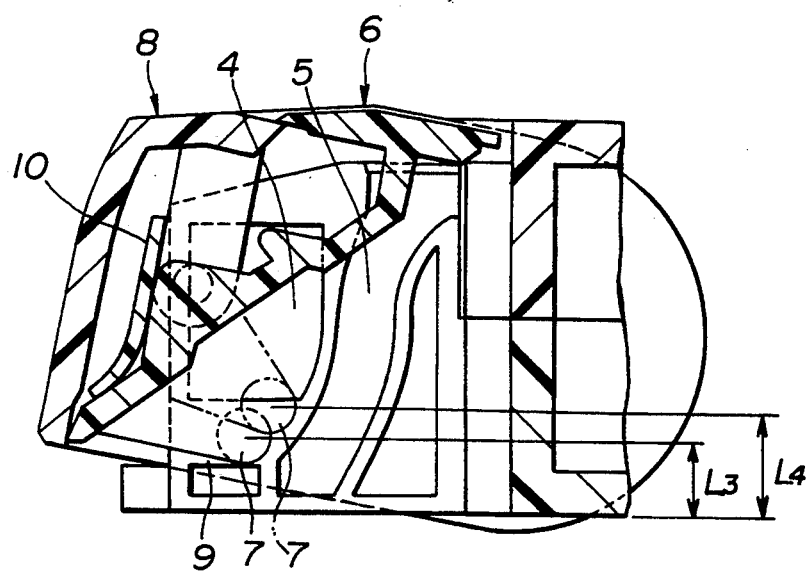
FIG. 5 is an enlarged cross-sectional view of the cassette lid, sub lid and cam groove portion when the tape cassette is in a closed state.

Referring now to FIG. 5, a principle feature of the invention will be noted. At a lower portion of the concave portion 4 adjacent the cam groove 5, a rib 9 is provided. When the cam boss of the sub lid 6 moves over the rib forming the cam groove 5 and comes into the area of the concave portion 4, the cam boss portion moves on the rib 9 and does not engage the concave portion 4. Thus, it becomes easier to recover the position of the cam boss 7.

Hereinbelow the structural arrangement of the rib portion relative the cam groove portion of the tape cassette 1 will be set out in detail.

Figure 2:
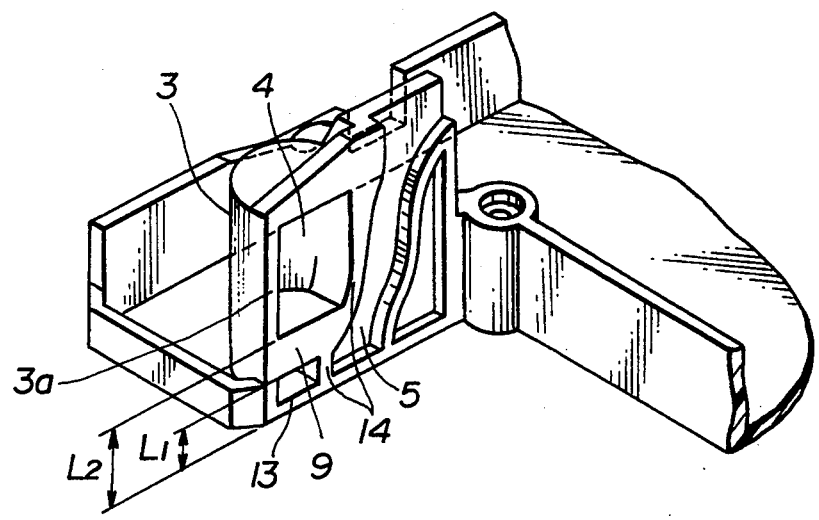
FIG. 2 is an enlarged perspective view of the cam groove portion of the tape cassette of FIG. 1.

Referring to FIG. 2, according to the present embodiment, a bottom edge of the rib 9 is formed at a height L1 from a bottom surface 13 of the the lower cassette shell 12. The height L1 according to the present embodiment is established at 1 mm. An upper edge of the rib 9 is established at a height L2 above the lower surface 13 of the lower cassette shell 12 and the height L2 according to this embodiment is 7 mm. As seen clearly in FIG. 2, a surface of the rib 9 is on the same plane as the rib 3a forming the tape guide surface 3, the rib member 14 dividing the cam groove from the concave portion 4, and the edge of the bottom surface 13 of the lower shell 12.

As seen in FIG. 5 a height of a dead center portion of the cam boss 7 passes over the concave portion 4 at a position between heights L3 and L4, which may be between 3 mm–4 mm, for example.

Thus, since the rib occupies a space between 1 mm–7 mm above the bottom surface 13 of the lower shell 12, the cam boss 7 is effectively prevented from entering the concave portion 4.

Figure 6:
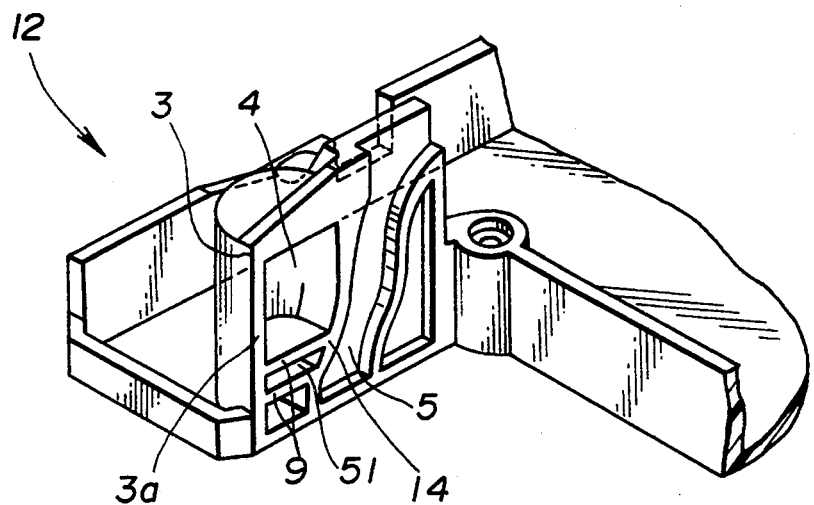
FIG. 6 is an enlarged perspective view of a second embodiment of a cam groove portion of a tape cassette according to the invention.

Further, referring to FIG. 6, a second embodiment of a tape cassette according to the invention is shown. The tape cassette may be of identical construction to that described in connection with the first embodiment, however, an alternative construction of the rib 9 is provided. According to this construction upper and lower ribs 9, 9 are provided. The lower rib is provided at the height L1 (1 mm) and the upper rib is provided at the height L2 (7 mm) as in the previously-described arrangement. According to this construction, the same effect is obtained as in the above-described first embodiment, while according to the second embodiment, material, weight and costs are reduced.

Figure 7:
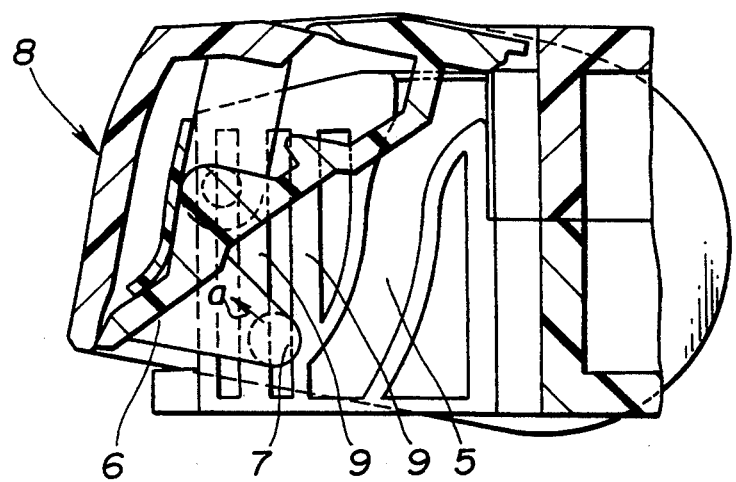
FIG. 7 is an enlarged cross-sectional view of a cassette lid, sub lid and a cam groove portion according to a third embodiment of the invention.
Figure 8:
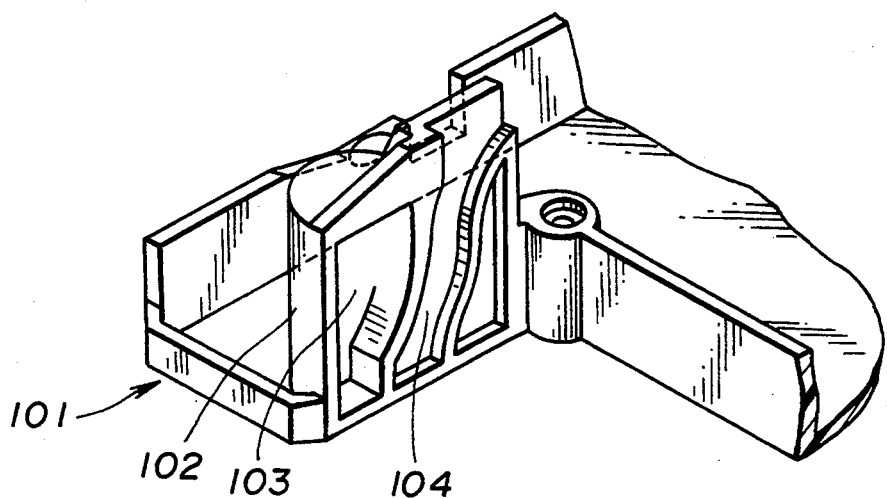
FIG. 8 is an enlarged perspective view of a conventional cam groove portion of a tape cassette.
Figure 9:
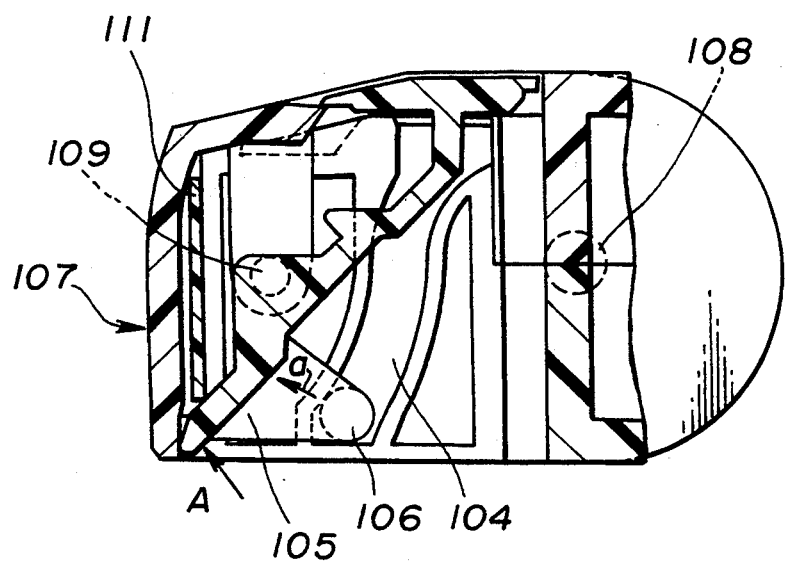
FIG. 9 is an enlarged cross-sectional view of a cassette lid, sub lid and the conventional cam groove portion of FIG. 8.
Figure 10:
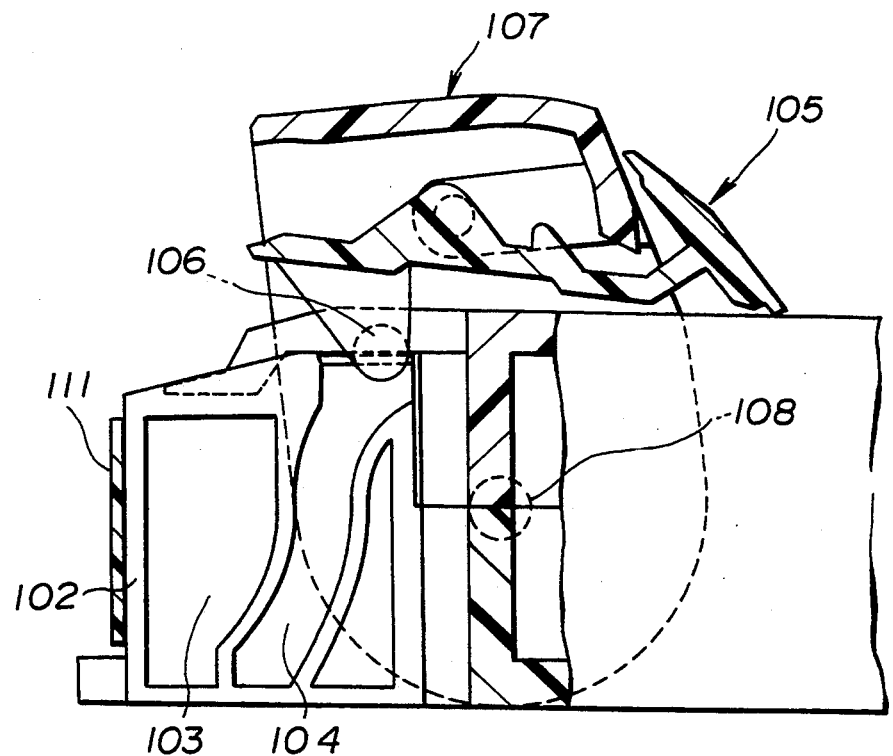
FIG. 10 is an enlarged cross-sectional view of the cassette lid, sub lid and the conventional cam groove portion when the tape cassette is in an opened state.
Figure 11:
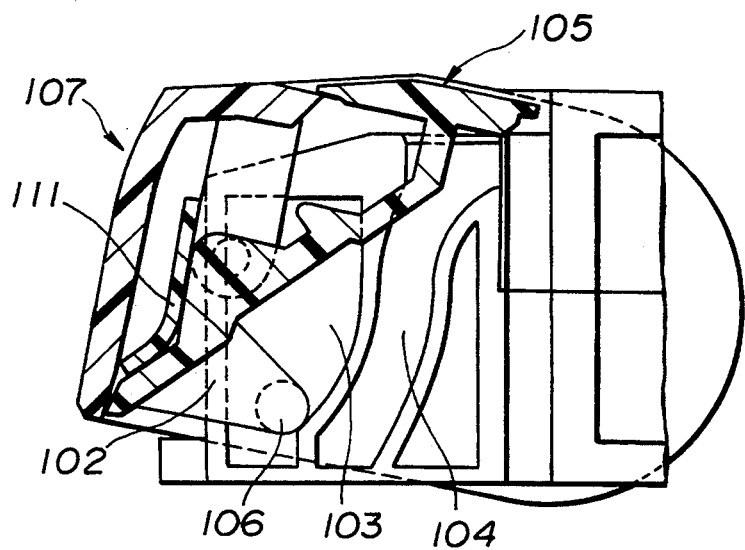
FIG. 11 is an enlarged cross-sectional view of the cassette lid, sub lid and the conventional cam groove portion when the tape cassette is in a closed state.

Referring now to FIG. 7, a third embodiment of a tape cassette according to the invention is shown. Again, the tape cassette may be of identical construction as that described in connection with the first embodiment, however, another alternative construction of the rib 9 is provided. According to this construction left and right ribs 9, 9 are provided. The left and right ribs 9, 9 are vertically arranged over the concave portion 4 such that spaces between the ribs 9, 9, and spaces between the left rib 9 and the rib 3a forming the tape guide portion 3 and spaces between the right rib 9 and the rib 14 dividing the cam groove 5 and the concave portion 4 are held smaller than a circular area of the cam boss 7.

According to this construction also, the same effect is obtained as in the above-described first embodiment, while according to the third embodiment, material, weight and costs are reduced.

In the above described embodiments, the direction of the ribs 9 is the same as the direction of movement of a sliding core which is used in a plastic molding process. Thus the manufacturing process of these embodiments is the same as before.

Thus, according to the invention, reliable closing of a tape cassette lid arrangement may be assured. Further, the present invention may be applied to 8 mm video, digital audio, or any other format of cassettes which employ a lid/sub lid type arrangement.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A tape cassette, comprising:
   a cassette shell having an opening at one side thereof;
   first and second reels having a length of tape wound therebetween and rotatably posed in said cassette shell;
   a main lid disposed over said opening of said cassette shell;
   a sub lid co-operating with said main lid during opening and closing operations of said tape cassette and having cam boss portions formed at opposing outer ends thereof; and
   side portions at each side of said opening of said cassette shell including:
      cam grooves for guiding opening and closing operations of said cam boss portions of said sub lid, said sub lid cam boss portions being movable relative to said cam grooves,
      tape guide surfaces formed on outward sides of said side portions,
      concave portions backing said tape guide surfaces adjacent said cam grooves, and
      rib portions formed across a bottom of said concave portions, being in sliding contact with each of said cam boss portions and acting to prevent each of said cam boss portions from entering said concave portions,
   wherein a longitudinal orientation of each of said rib portions is perpendicular to a traveling direction of said tape.

2. A tape cassette, comprising:
   a cassette shell having an opening at one side thereof;
   first and second reels having a length of tape wound therebetween and rotatably disposed in said cassette shell;
   a main lid disposed over said opening of said cassette shell;
   a sub lid co-operating with said main lid during opening and closing operations of said tape cassette and having cam boss portions formed at opposing outer ends thereof; and
   side portions at each side of said opening of said cassette shell including:
      cam grooves for guiding opening and closing operations of said cam boss portions of said sub lid, said sub lid cam boss portions being movable relative to said cam grooves,
      tape guide surfaces formed on outward sides of said side portions,
      concave portions backing said tape guide surfaces adjacent said cam grooves, and
      rib portions formed across a bottom of said concave portions, being in sliding contact with each of said cam boss portions and acting to prevent each of said cam boss portions from entering said concave portions,
   wherein said rib portions are formed as one or more wall portions of a same height as each of said concave portions.

3. A tape cassette, comprising:
   a cassette shell having an opening at one side thereof;
   first and second reels having a length of tape wound therebetween and rotatably disposed in said cassette shell;
   a main lid disposed over said opening of said cassette shell;
   a sub lid co-operating with said main lid during opening and closing operations of said tape cassette and having cam boss portions formed at opposing outer ends thereof; and
   side portions at each side of said opening of said cassette shell including:
      cam grooves for guiding opening and closing operations of said cam boss portions of said sub lid, said sub lid cam boss portions being movable relative to said cam grooves,
      tape guide surfaces formed on outward sides of said side portions,
      concave portions backing said tape guide surfaces adjacent said cam grooves, and
      rib portions formed across a bottom of said concave portions, being in sliding contact with each of said cam boss portions and acting to prevent each of said cam boss portions from entering said concave portions,
   wherein each of said rib portions comprises a plurality of wall portions.

4. A tape cassette as set forth in claim 3, wherein a height of a center point of said cam boss portions when in motion across said concave portions during opening and closing of said tape cassette is between 3 mm and 4 mm from a bottom surface of said cassette shell and said rib portions are between 1 mm and 7 mm from said bottom surface of said cassette shell.

5. A tape cassette as set forth in claim 3, wherein a longitudinal orientation of said plurality of wall portions is in a traveling direction of said tape.

6. A tape cassette as set forth in claim 3, wherein a longitudinal orientation of said plurality of wall portions is perpendicular to a traveling direction of said tape.

7. A tape cassette as set forth in claim 6, wherein a width of spaces between each of said plurality of wall portions and between said plurality of wall portions and sides of said concave portions are less than a width of a contacting surface of said cam boss portions.

* * * * *

UNITED STATES PATENT AND TRADEMARK OFFICE
CERTIFICATE OF CORRECTION

PATENT NO. : 5,407,145
DATED : April 18, 1995
INVENTOR(S) : Yuji Iwahashi

It is certified that error appears in the above-indentified patent and that said Letters Patent is hereby corrected as shown below:

Col. 3, line 44, after "features" delete ":"

Col. 5, line 13, change "posed" to --disposed--

Signed and Sealed this

Thirtieth Day of July, 1996

Attest:

BRUCE LEHMAN

Attesting Officer

Commissioner of Patents and Trademarks